United States Patent [19]

Scholtissek et al.

[11] Patent Number: 4,464,890
[45] Date of Patent: Aug. 14, 1984

[54] INTAKE REEL FOR AGRICULTURAL MACHINE

[75] Inventors: Georg Scholtissek, Neustadt; Peter Grohmann, Bad Schandau, both of German Democratic Rep.

[73] Assignee: Veb Kombinat Fortschritt Landmaschinen, Neustadt in Sachsen, German Democratic Rep.

[21] Appl. No.: 443,617

[22] Filed: Nov. 22, 1982

[30] Foreign Application Priority Data

Dec. 12, 1981 [DD] German Democratic Rep. ... 235622

[51] Int. Cl.$^3$ .............................................. A01D 87/00
[52] U.S. Cl. ........................................ 56/364; 56/17.2
[58] Field of Search .................................. 56/364, 17.2

[56] References Cited

U.S. PATENT DOCUMENTS

| 2,729,049 | 1/1956 | Porter | 56/364 |
| 2,906,076 | 9/1959 | McCarty et al. | 56/364 |
| 3,815,346 | 6/1974 | Nelson | 56/364 |
| 4,161,859 | 7/1979 | Storm et al. | 56/364 |
| 4,297,833 | 11/1981 | Gaeddert et al. | 56/364 |
| 4,304,089 | 12/1981 | Mesharyakov et al. | 56/364 |
| 4,344,273 | 8/1982 | Jobling et al. | 56/364 |
| 4,353,201 | 10/1982 | Pierce et al. | 56/364 |

FOREIGN PATENT DOCUMENTS

| 8000724 | 4/1980 | Fed. Rep. of Germany. |
| 128901 | 12/1979 | German Democratic Rep. . |
| 143494 | 8/1980 | German Democratic Rep. . |

Primary Examiner—Paul J. Hirsch
Attorney, Agent, or Firm—Karl F. Ross; Herbert Dubno

[57] ABSTRACT

An agricultural-machine intake has a frame adapted to travel along the ground in a travel direction, a transverse feeder fixed extending horizontally and transversely to the direction on the frame, a pair of end mounts on the frame and a center mount transversely flanked thereby, supports carrying the mounts on the frame for up and down movement generally tangential of the transverse feeder, and a jointed reel centered on and rotatable about at least one horizontal reel axis extending transverse to the direction through the mounts. The reel has outer ends journaled in the end mounts, a jointed center journaled in the center mount and axially subdividing the reel into two halves, and radially extending tines. Respective ground-engaging end and center skids are vertically displaceable on the frame. Respective end and center links connect the end and center skids to the respective mounts for synchronous vertical movement of the skids with the respective mounts. A drive rotates the reel about the reel axis and thereby picks crop up off the ground. An array of strippers fixed on the frame spacedly surrounds the reel between the tines. Thus the picked-up crop is pulled off the tines by the strippers.

11 Claims, 7 Drawing Figures

INTAKE REEL FOR AGRICULTURAL MACHINE

FIELD OF THE INVENION

The present invention relates to an intake reel for an agricultural machine. More particularly this invention concerns such a reel which follows the contours of the underlying ground to efficiently pick crop up off the ground.

BACKGROUND OF THE INVENTION

East German Pat. No. 128,901 describes an intake reel for a self-powered agricultural machine which is designed to pick up cut crop, such as alfalfa, lying strewn carpet-fashion on the ground. The machine clears a wide swathe ahead of itself, picking up the crop and passing it up and back to a side feeder which conveys it off to the side to, for example, a baler. The reel has two independent halves that are separately guided relative to the ground along with support structure for strippers that pull the picked-up crop off the tines of the reel. As a result of the bulkiness and mass of these systems they do not follow the contours very responsively or sensitively. Hence it is necessary to set them a little high so some crop is not picked up, an obvious waste. In addition the picked up crop is inefficiently passed to the side feeder so that it occasionally jams up, making a blockage that must be cleared before the machine can go on.

In addition German utility model No. 8,000,724 describes a reel wherein the tines are mounted on respective rods that extend parallel to the reel axis which is horizontal and perpendicular to the machine travel direction. These rods can be pivoted about their own axes by means of of crank and cam arrangements which twist the tine-carrying rods as they orbit about the reel axis so that the tines are extended fully as they sweep forward across the ground against the travel direction and up, but so that they pivot in and shed crop on the tops of the strippers, whence it is easily transmitted to the side feeder. Separate cranks and cams are provided at both ends of the reel so that the considerable torsion exerted by the tines need not be transmitted the full length of their rods. The rods are not axially throughgoing, but instead only extend from a center plate to a respective end plate. At the center plate the rods angularly alternate to prevent overload of the drive motor for the reel.

Other arrangements, such as described in East German Pat. No. 143,496, are frequently quite complex, and not usable in any situations where the ground from which the crop is being picked up is not fairly level. Those machines capable of working in irregular terrain are invariably relatively short so they are not efficient.

OBJECTS OF THE INVENTION

It is therefore an object of the present invention to provide an improved intake for an agricultural machine.

Another object is the provision of such an intake for an agricultural machine which overcomes the above-given disadvantages.

A further object is to provide a wide-reel intake that can negotiate and conform to irregular terrain and that can pick up crop efficiently.

SUMMARY OF THE INVENTION

These objects are attained according to the instant invention in an agricultural-machine intake having a frame adapted to travel along the ground in a travel direction, a transverse feeder fixed extending horizontally and transversely to the direction on the frame, a pair of end mounts on the frame and a center mount transversely flanked thereby, support means carrying the mounts on the frame for up and down movement generally tangential of the transverse feeder, and a jointed reel centered on and rotatable about at least one horizontal reel axis extending transverse to the direction through the mounts. The reel has outer ends journaled in the end mounts, a jointed center journaled in the center mount and axially subdividing the reel into two halves, and radially extending tines. Respective ground-engaging end and center skids are vertically displaceable on the frame. Respective end and center link means connect the end and center skids to the respective mounts for synchronous vertical movement of the skids with the respective mounts. Drive means rotates the reel about the reel axis and thereby picks crop up off the ground. An array of strippers fixed on the frame spacedly surrounds the reel between the tines. Thus the picked-up crop is pulled off the tines by the strippers.

With this system the structure that is guided for movement relative to the frame to follow the contours of the underlying ground is minimized. Only the reel itself is raised and lowered. The strippers and all other structure is fixed to the frame. In addition the jointed reel can flex in the middle to conform to any normal terrain. Thus reducing the mass of this equipment makes it able to respond rapidly and sensitively to changes in terrain.

According to another feature of this invention the skids have and are fixed to respective upright posts. In addition the frame is provided with end and center vertical guides slidably vertically receiving the posts.

The link means according to the invention each include an element pivotal on the frame about a horizontal axis generally parallel to the reel axis and having two radially projecting arms, a rigid input link pivoted on one of the arms and on the respective skid, and a rigid output link pivoted on the other of the arms and on the respective mount. Typically the two end link means are thus constituted.

The center mount and link means thus include an upright post having a lower end fixed to the center skid, a center bearing supporting the jointed center of the reel and fixed on the upright post, and a center guide on the frame supporting the post for up and down movement generally tangentially of the transverse feeder.

In addition the tines are operated by respective cam means on the end mounts that move the tines of the respective reel halves radially in as they sweep past the transverse feeder and radially out as they sweep the ground on rotation of the reel about the reel axis. The tine rods are therefore operated at their outer ends so that no bulky equipment is attached to the center of the reel.

In order to reduce the force that the skids bring to bear on the ground, and therefore to reduce wear of this part, respective end and center spring means are braced between the frame and the respective mounts for urging same upward. In addition these springs make the reel respond accurately and sensitively to the contour of the underlying ground.

The jointed center includes a swivel joint so that the reel halves are centered on respective axes that are coaxial or intersecting at the center. In addition the center has a torsion-transmitting coupling. The drive means therefore need only be connected to one of the reel halves. One of the reel halves is provided at the jointed center with an eye adjustable axially of the one reel half, and the other reel half is provided with an element extending snugly transversely of the reel axes through the eye. Thus the relative axial position of the reel halves is determined by the position of the eye.

The center guide includes a set of upright slide rails on the center mount and on the frame and defining a displacement path for the center guide extending generally tangentially of the transverse feeder. This structure can be quite small so that the reel is axially continuous, that is transversely to the travel direction.

The strippers according to this invention are hoops connected in the direction behind the reel to the frame and loosely surrounding the reel.

DESCRIPTION OF THE DRAWING

The above and other features and advantages will become more readily apparent from the following, reference being made to the accompanying drawing in which.

SPECIFIC DESCRIPTION

Figure 1:
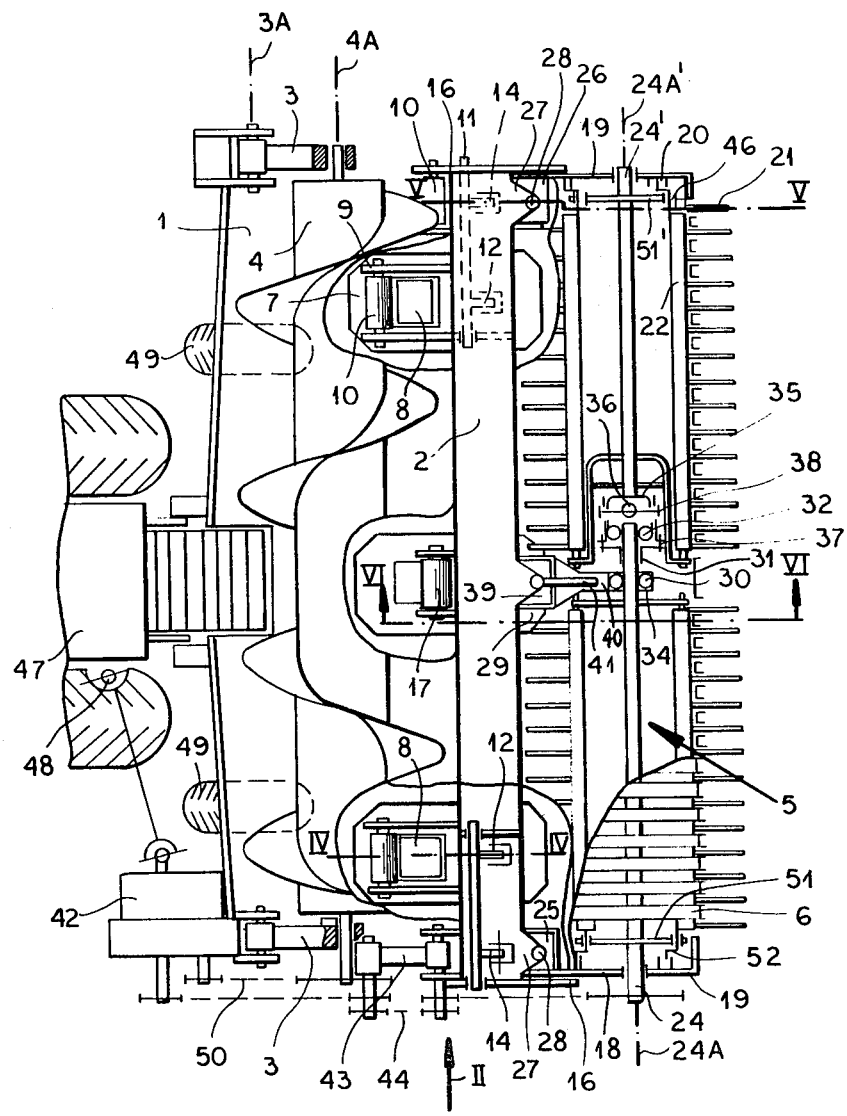
FIG. 1 is a top view of the reel-type crop intake according to this invention.
Figure 2:
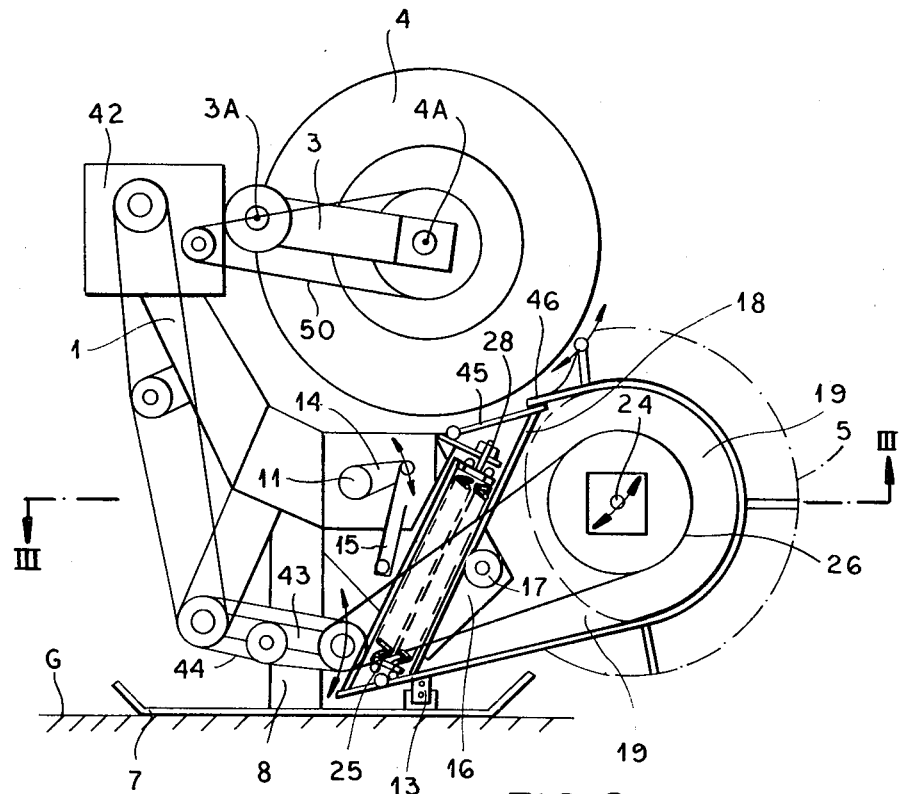
FIG. 2 is an end view taken in the direction of arrow II of FIG. 1.
Figure 3:
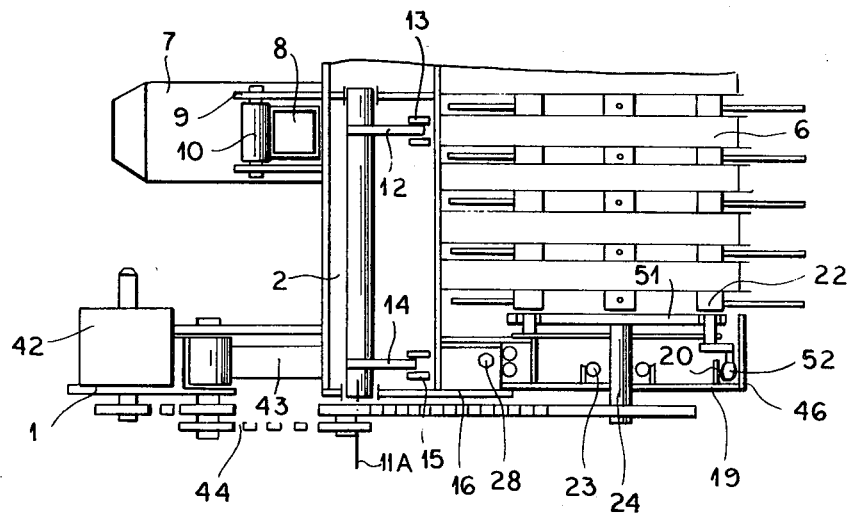
FIG. 3 is a section taken along line III—III of FIG. 2.

As seen in FIG. 1, a reel-type intake serving, for example, to pick up mowed hay in front of a tractor 47 traveling in a direction D and having a power takeoff 48, has a frame 1 secured to the tractor 47 and riding via wheels 49 on the ground G (FIG. 2). A pair of parallel arms 3 have rear ends pivoted on the frame 1 about a horizontal axis 3A and front ends on which a standard auger-type lateral feeder 4 is rotatable about a horizontal and transverse axis 4A parallel to the axis 3A and above a main cross beam 2 of the frame 1. The frame 1 carries a drive transmission 42 connected to the PTO 48 and connected via a chain 50 to the auger 4 so that crop delivered to it is moved to the side for baling or other treatment.

Figure 4:
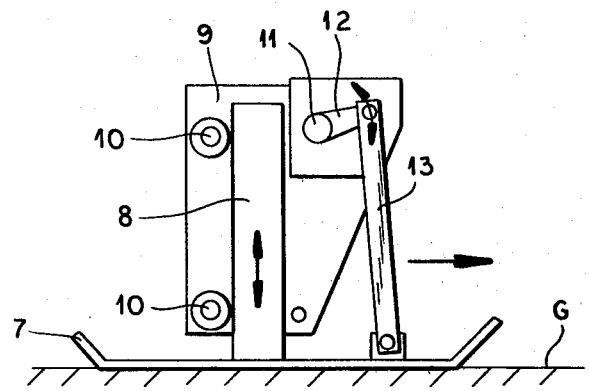
FIGS. 4, 5, and 6 are sections taken respectively along lines IV—IV, V—V, and VI—VI of FIG. 1.
Figure 5:
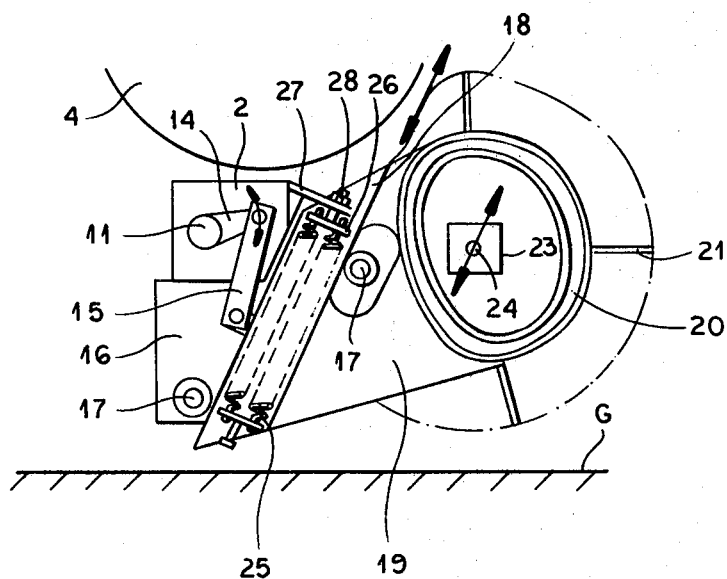

A centrally jointed reel 5 shown in more detail in FIGS. 2-7 has two shafts 24 and 24' that are centered on normally coaxial axes 24A and 24A' in front of the cross beam 2. The shaft 24 is fixed at its outer end to a plate 51 perpendicular to the axis 24A and at its inner end has an identical such plate 33. The shaft 24' has an identical such outer plate 51' and at its inner end is provided with a bell 34 having an annular plate or flange confronting the plate 33. Each shaft 24 and 24' has four rods 22 angularly equispaced about and radially equispaced from the respective axes 24A and 24A' and journaled at their ends in the respective plates 51, 51', 33, and 34 for rotation about respective axes parallel to the respective axes 24A and 24A'. Each of these shafts 22 carries a plurality of identical flexible steel tines 21 all lying in a common plane and all extending radially from the respective shaft 22. The rods 22 of the one shaft 24 are offset by 45° to those of the other shaft 24'. At its outer end each shaft 22 further has a crank 52 (FIG. 3) that engages in a cam groove 20 (FIGS. 3 and 5) itself formed in or constituted by an annular channel fixed to a respective outer plate 19 having a respective bearing 23 in which the outer end of the respective central shaft 24 or 24' is journaled. As seen in FIG. 5 each cam 20 is so shaped that when the shafts 22 are ahead in the direction D of the respective shafts 24 and 24' the respective tines 21 extend radially from the respective axis 24A or 24A', but when behind the respective shafts 24 or 24' they are pivoted in to clear other structure on the machine which will be described below.

U-shaped stripper hoops 6 lie between the tines 21 and have upper and lower ends fixed to the frame 2 as seen in FIG. 2. These hoops 6 are made of steel bands that surround the reel 5 between the tines 6 with some play, forming slots through which the tines 21 project. Thus as the shafts 22 orbit about the axes 24A and 24A' crop will be picked up off the ground G, then moved up and back to the auger 4, being freed from the tines 21 as they fold back and move down between the upper sides of the strippers 6.

The outer ends of the shafts 24 and 24' are, as mentioned above, journaled in plates 19 which can move generally vertically on the frame 1. To this end the beam 2 of the frame 1 has, as seen in FIGS. 4 and 5, plates 16 juxtaposed with the plates 19 and provided with rollers 17 on which a bent-in portion 18 of the respective plate 19 rides.

Respective shoes or skids 7 somewhat inside the plates 19 ride on the ground and each have an upright leg or post 8 supported on plates 9 of the frame by rollers 10 so that these skids 7 can move up and down relative to the frame 1, following the contours of the ground G. Respective rods 11 pivoted about horizontal axes 11A parallel to the axes 3A and 4A have at their outer ends radially forwardly extending arms 14 pivoted to the upper ends of respective upright links 15 having lower ends pivoted on the portions 18 of the respective plates 19. At their inner ends these rods 11 have radially forwardly projecting arms 12 connected via links 13 like the links 15 to the skids 7. Thus the plates 19 and the outer ends of the reel 5 carried by them will be constrained to move up and down with the respective skids 7. This motion is not purely vertical, but along an inclined plane that is tangent to the feeder 4 so that the picked-up crop is passed neatly to the feeder 4 regardless of the vertical position of the reel 5.

In order to prevent the skids 7 from having to carry the entire weight of the reel 5, springs 25 are tensioned between the plates 19 and spring plates 26 connected via a bolt 28 to a plate 27 on the frame 1. The bolt 28 allows the springs 25 to be tensioned to carry virtually all of the weight of the reel 5 and its associated vertically movable structure, so that the skids 7 only rub lightly on the ground. This reduces wear for these skids while ensuring that the reel will sensitively follow the ground.

Figure 6:
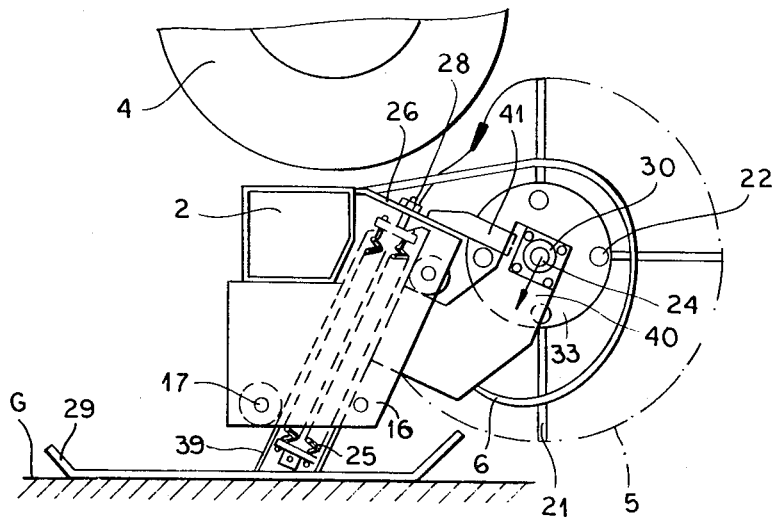
Figure 7:
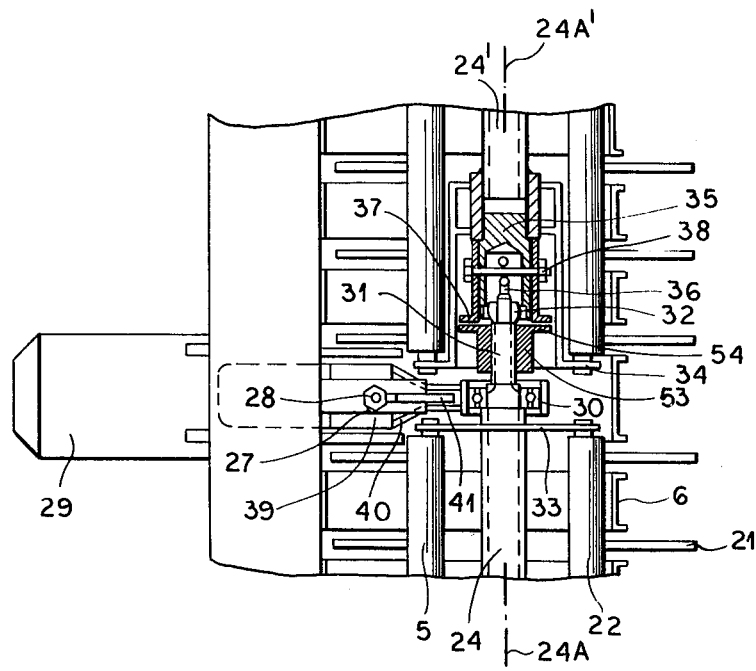
FIG. 7 is a top view partly in section of the structure shown in FIG. 6.

As shown in detail in FIGS. 6 and 7 the inner end of the shaft 24 is supported in a bearing 30 in a U-shaped plate 40 guided by and embracing a guide plate 41 fixed on the frame member 2. This plate 40 is fixed on a post 39 extending like the portions 18 up and to the front and guided in rollers 17 on a plate 16 fixed to the beam 2. Another arrangement of springs 25 identical to that described with reference to FIGS. 4 and 5 but mounted inside the square-section leg or post 39 supports this plate 40 and the center of the jointed reel 5. A skid 29 carried on the lower end of the post 39 rides on the ground to support the center of the reel 5 at a fixed distance above the ground G. In this manner the jointed center of the reel 5 also can move on the frame 1 to follow the contours of the underlying ground, independently of the motion of the reel ends.

As best seen in FIGS. 1 and 7 the inner end of the shaft 24 passes through the bearing 30 and is formed with a splined end extension 31 axially slidable in a collar 53 having a sprocket-like periphery connected via a double chain 54 to the similarly identically shaped periphery 37 of an end fitting 35 carried on the inner end of the shaft 24' inside the bell 34. In this manner torque is transmitted between the two halves of the reel 5 since only the tube shaft 24 is connected to the transmission 4. The reel 5 is driven through a system of chains 44 connected to the transmission 42 and passing over a pivotal drive arm 43.

The inner end of the tube shaft 24 is mounted via a swivel 32 in this fitting 35 so the two axes 24A and 24A' are either coaxial or intersect at all times. An eye bolt 36 fitted in the inner end of the shaft 24 is traversed by a pin 38 in the fitting 35, so that the axial spacing of the two shafts 24 and 24' is set in this location by opening up the joint and screwing the eye bolt in or out, depending on which direction of adjustment was needed. The axial positions of the shafts 24 and 24' are set so that the tines 21 are centered in the slots between the strippers 6.

The equipment is protected by hinged flaps 45 so that its parts do not get fouled with cut crop and to protect the operator and these in turn are protected by side shields 46.

With the arrangement according to the invention the reel 5 can be quite long. Since it is centrally jointed and arranged to feel and follow the ground at both ends and in the center it still can conform to fairly irregular terrain. Thus a large-capacity machine can be used in rough farmland where such machinery was normally not considered.

We claim:

1. An intake for an agricultural machine, the intake comprising:
    a frame adapted to travel along the ground in a travel direction;
    a transversely mounted feeder extending horizontally and transversely to the direction on the frame;
    a pair of end mounts on the frame and a center mount transversely flanked thereby;
    support means carrying the mounts on the frame for up and down movement generally tangential of the transverse feeder;
    a jointed reel centered on and rotatable about at least one horizontal reel axis extending transverse to the direction through the mounts, the reel having outer ends journaled in the end mounts, a jointed center journaled in the center mount and axially subdividing the reel into two halves, and radially extending tines;
    respective ground-engaging end and center skids vertically displaceable on the frame;
    respective end and center link means connecting the end and center skids to the respective mounts for synchronous vertical movement of the skids with the respective mounts;
    drive means for rotating the reel about the reel axis and thereby picking crop up off the ground; and
    an array of strippers fixed on the frame and spacedly surrounding the reel between the tines, whereby the picked-up crop is pulled off the tines by the strippers.

2. The agricultural-machine intake defined in claim 1 wherein the skids have and are fixed to respective upright posts, the frame being provided with end and center vertical guides slidably vertically receiving the posts.

3. The agricultural-machine intake defined in claim 2 wherein at least one of the link means includes:
    an element pivotal on the frame about a horizontal axis generally parallel to the reel axis and having two radially projecting arms;
    a rigid input link pivoted on one of the arms and on the respective skid; and
    a rigid output link pivoted on the other of the arms and on the respective mount.

4. The agricultural-machine intake defined in claim 1, further comprising
    respective cam means on the end mounts for moving the tines of the respective reel halves radially in as they sweep past the transverse feeder and radially out as they sweep the ground on rotation of the reel about the reel axis.

5. The agricultural-machine intake defined in claim 1, further comprising
    respective end and center spring means braced between the frame and the respective mounts for urging same upward and thereby substantially taking the weight of the reel off the skids.

6. The agricultural-machine intake defined in claim 1 wherein the center mount and link means include:
    an upright post having a lower end fixed to the center skid;
    a center bearing supporting the jointed center of the reel and fixed on the upright post; and
    a center guide on the frame supporting the post for up and down movement generally tangentially of the transverse feeder.

7. The agricultural-machine intake defined in claim 1 wherein the jointed center includes a swivel joint, whereby the reel halves are centered on respective axes that are coaxial or intersecting at the center.

8. The agricultural-machine intake defined in claim 7 wherin the jointed center further includes a torsion-transmitting coupling, the drive means only being connected to one of the reel halves.

9. The agricultural-machine intake defined in claim 7 wherein one of the reel halves is provided at the jointed center with an eye adjustable axially of the one reel half, and the other reel half is provided with an element extending snugly transversely of the reel axes through the eye, whereby the relative axial position of the reel halves is determined by the position of the eye.

10. The agricultural-machine intake defined in claim 1, further comprising
    a center guide including a set of upright slide rails on the center mount and on the frame and defining a displacement path for the center guide extending generally tangentially of the transverse feeder.

11. The agricultural-machine intake defined in claim 1 wherein the strippers are hoops connected in the direction behind the reel to the frame and loosely surrounding the reel.

* * * * *